United States Patent
Glew et al.

[19]

[11] Patent Number: 5,974,523
[45] Date of Patent: *Oct. 26, 1999

[54] MECHANISM FOR EFFICIENTLY OVERLAPPING MULTIPLE OPERAND TYPES IN A MICROPROCESSOR

[75] Inventors: Andrew F. Glew, Madison, Wis.; Darrell D. Boggs, Aloha, Oreg.; Michael A. Fetterman, Hillsboro, Oreg.; Glenn J. Hinton; Robert P. Colwell, both of Portland, Oreg.; David B. Papworth, Beaverton, Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/709,216

[22] Filed: Sep. 6, 1996

Related U.S. Application Data

[63] Continuation of application No. 08/293,388, Aug. 19, 1994, Pat. No. 5,555,432.

[51] Int. Cl.⁶ ........................................... G06F 9/38
[52] U.S. Cl. .......................... 712/23; 712/200; 712/217
[58] Field of Search ............................. 395/800.03, 376, 395/393, 391; 712/23, 217, 200

[56] References Cited

U.S. PATENT DOCUMENTS

| | | | |
|---|---|---|---|
| 5,276,891 | 1/1994 | Patel | 395/898 |
| 5,519,864 | 5/1996 | Martell et al. | 395/391 |
| 5,555,432 | 9/1996 | Hinton et al. | 395/800.23 |
| 5,574,928 | 11/1996 | White et al. | 395/800.23 |
| 5,640,588 | 6/1997 | Vegesna et al. | 395/800.23 |

OTHER PUBLICATIONS

McGeady, S., "A Programmer's View of the 80960 Architecture," Abstract, 1989 IEEE, pp. 4–9.

Schoebel, David A., "80960 Tool Technology For Embedded Control," Abstract, 1989 IEEE, pp. 10–12.

Hinton, G., "80960—Next Generation," Abstract, 1989 IEEE, pp. 13–17.

*Primary Examiner*—Meng-Ai T. An
*Assistant Examiner*—Walter D. Davis, Jr.
*Attorney, Agent, or Firm*—Blakely, Sokoloff, Taylor & Zafman

[57] ABSTRACT

A mechanism for efficiently overlapping multiple operand types is used in a microprocessor which includes a plurality of execution units and a mechanism to provide operations, which include one or more operands, to the plurality of execution units. Each of the plurality of execution units interprets the one or more operands as different types of operands, and the mechanism to provide operations overlaps the different types of operands.

27 Claims, 5 Drawing Sheets

MECHANISM FOR EFFICIENTLY OVERLAPPING MULTIPLE OPERAND TYPES IN A MICROPROCESSOR

This application is a continuation of application Ser. No. 08/293,388, filed Aug. 19, 1994, U.S. Pat. No. 5,555,432, to Glenn J. Hinton, Robert W. Martell, Michael A. Fetterman, David B. Papworth and James L. Schwartz, and commonly assigned to the assignee of the present invention.

BACKGROUND OF THE INVENTION

1. Field of the Invention

The present invention pertains to the field of microprocessor architecture. More particularly, this invention relates to combining data paths in a microprocessor.

2. Background

As the computer revolution has progressed the quest of microprocessor developers has been to develop chips exhibiting more power and faster performance. Initial efforts focused essentially on increasing transistor populations on single microprocessor integrated circuits. That effort continues with today's microprocessors now housing literally millions of transistors on a single chip. Further integration has allowed processor clock speeds to be greatly increased with the increased density of transistors.

Given the large number of transistors involved, modem microprocessors are divided into discrete functional blocks through which instructions are propagated one stage at a time. This allows for pipelining of instructions such that when one instruction has completed the first stage of processing and moves on to the second stage, a second instruction can begin the first stage. Thus, even where each instruction requires a number of clock cycles to complete all stages of processing, pipelining provides for the completion of instructions on every clock cycle. This single-cycle throughput of a pipelined microprocessor greatly increases the overall performance of computer systems.

Other enhancements to microprocessor design include the development of superscalar microprocessors which are capable of initiating more than one instruction at the initial stage of the pipeline per clock cycle. Likewise, in a superscalar microprocessor, frequently more than one instruction completes on a given clock cycle. Other development efforts have gone into the simplification of microprocessor instruction sets, developing reduced instruction set computer (RISC) microprocessors which exploit the fact that many simple instructions are more commonly executed than some complicated instructions. Eliminating the complicated instructions from the instruction set provides for a faster executing pipeline. Complicated instructions are carried out by combinations of the more simple instructions.

Substantial increases in instruction throughput are achievable by implementing out-of-order dispatch of instructions to the execution units of superscalar microprocessors. Many experiments have confirmed that typical Von Neumann code provides substantial parallelism and hence a potential performance boost by use of out-of-order execution. Out-of-order execution is possible when a given instruction does not depend on previous instructions for a result before executing. With out-of-order execution, any number of instructions are allowed to be executing in the execution units, up to the total number of pipeline stages for all the functional units.

Microprocessors execute a wide range of instructions based on various types of numbers, typically referred to as either floating point numbers or integer numbers. One method of executing floating point and integer instructions has been to use two different data paths for the instruction operands: one for floating point operations and the second for integer operations. These two different data paths and their corresponding control logic can be included on the same chip, or may be two physically separate chips. This separation of data paths for different operands, however, can require a large amount of chip area due to the duplication of registers to store the two types of data as well as duplicated control logic. Thus, it would be beneficial to provide a mechanism for overlapping multiple operand types in a microprocessor.

An additional enhancement to microprocessor performance is the data path width. Microprocessor integer data paths have grown in width to 32-bit and 64-bit data paths which are common today. Floating point data paths are even wider, typically being at least twice as wide as integer data paths. This large number of bits being routed around the chip requires significant chip area. Thus, it would be beneficial to provide a mechanism for overlapping multiple operand types and thereby reducing the amount of area required on a chip to support both floating point and integer data paths.

Additionally, different instructions of a typical instruction set require different numbers of operands, such as one, two or three operands. The additional data required for the three-operand instruction can result in significant additional chip area. Thus, it would be beneficial to provide a mechanism which supports instructions requiring different numbers of operands without requiring significant additional chip area and with little, if any, performance loss.

As will be described in more detail below, the present invention provides a mechanism for efficiently overlapping multiple operand types in a microprocessor that achieves these and other desired results which will be apparent to those skilled in the art from the description to follow.

SUMMARY OF THE INVENTION

A mechanism for efficiently overlapping multiple operand types in a microprocessor is described herein. A microprocessor in accordance with the present invention includes a plurality of execution units and a mechanism to provide operations, which include one or more operands, to the plurality of execution units. Each of the plurality of execution units interprets the one or more operands as different types of operands, and the mechanism to provide operations overlaps the different types of operands.

According to one embodiment of the present invention, the operands are stored in entries of a reservation station prior to being provided to the execution units. In this embodiment, the different types of operands for different operations are stored in the same entries of the reservation station. Additionally, the same data path is used to transfer the different types of operands to the appropriate execution units.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances, well known methods, procedures, components, and circuits have not been described in detail so as not to obscure aspects of the present invention.

Figure 1:
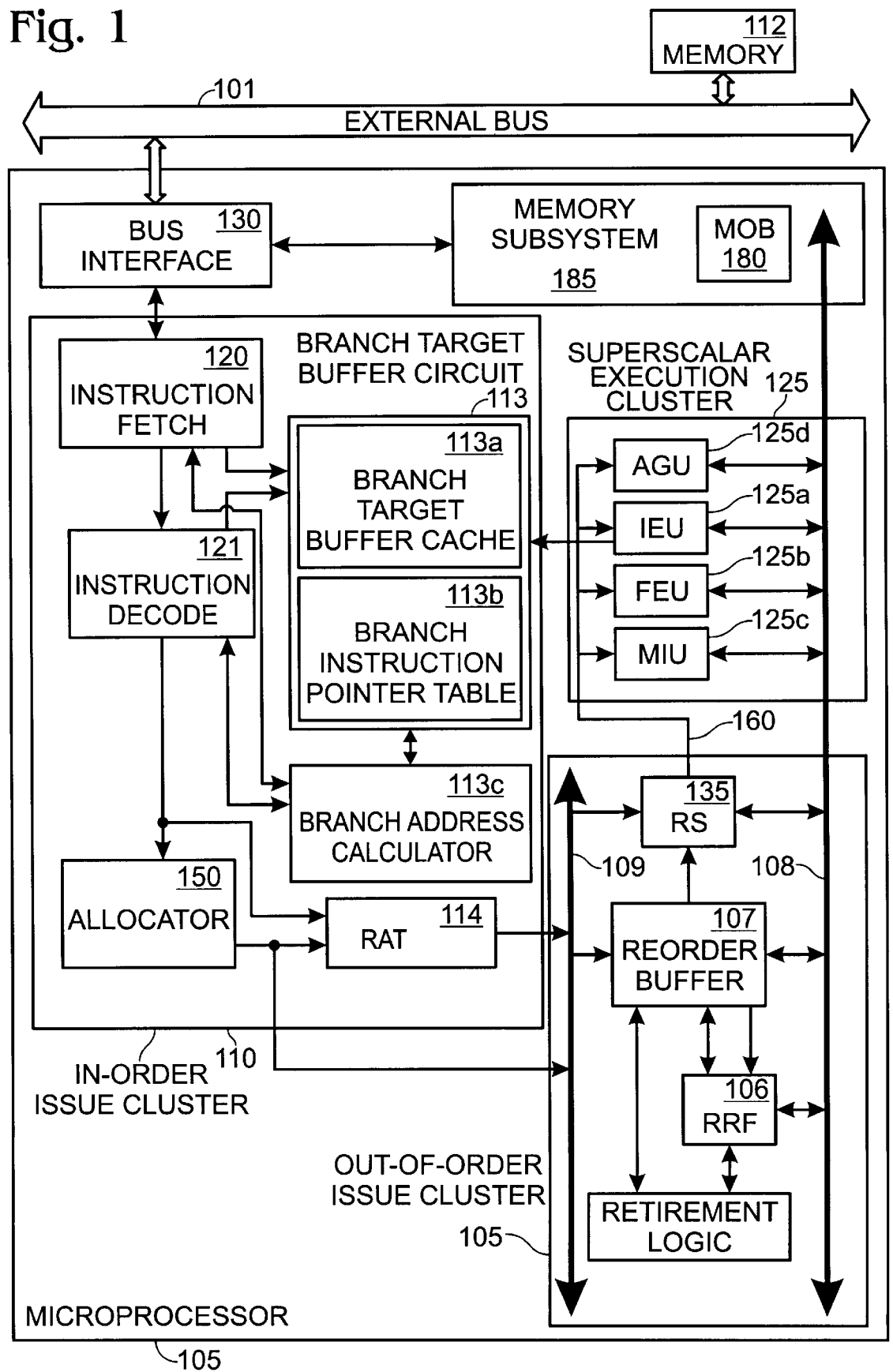
FIG. 1 is a block diagram of a microprocessor according to one embodiment of the present invention.

FIG. 1 illustrates a general block diagram of a processor 100 such as may be used with one embodiment of the present invention. The components of the processor 100 are shown in FIG. 1 to provide the general structure and interface of a processor such as may be used with the present invention.

In one embodiment, a microprocessor using the present invention, prior to executing Intel Architecture Microprocessor instructions, decodes them into a more simple, stylized sequence of "micro operations". The micro operations are then analyzed and scheduled according to resolved dependencies.

Generally, processor 100 is composed of an in-order portion 110 and an out-of-order portion 105 as shown. The branch target buffer (BTB) circuit 113, BTB cache 113a, branch instruction pointer 113b and the branch address calculator 113c perform speculative instruction execution by predicting program branch results to provide the pipeline with a steady source of instructions. The register alias table (RAT) 114 performs register renaming and is the last stage of the in-order pipeline and subsequent to this stage instructions and associated information are placed into the reservation station (RS) 135. Instructions that have been executed and are flowing from the out-of-order portion 105 retire to the real register file (RRF) 106 in program code order if they are determined to be part of a properly predicted program pathway and if no events have been detected (e.g., faults, traps, interrupts, etc.). The reorder buffer (ROB) 107 contains information that may be part of a speculatively predicted branch. The out-of-order cluster 105 schedules operations for execution to the execution cluster 125, receives the results of computations, and eventually updates the architecturally visible RRF 106 with these results, assuming the computations are part of a properly predicted branch and have detected no events.

An external address and data bus 101, a writeback bus 108, a dispatch bus 160, and an internal bus 109 are also illustrated. The writeback bus 108 carries results of computations from the execution cluster 125 to the reorder buffer 107 which holds the results until retirement. Dispatch bus 160 carries information relating to instructions dispatched from the reservation station to be executed within the execution cluster 125. A memory 112 for containing instruction and data information is coupled to bus 101 which is coupled to a bus interface unit 130.

The processor 100 includes instruction fetch 120 and decode 121 units with an integrated instruction cache (not shown). These instruction issue units are coupled to the bus interface 130 to receive instructions and data. The bus interface 130 is also coupled to a data cache memory (not shown). The instruction issue units (e.g., fetch and decode) are coupled to an allocator 150 which allocates entries of resource buffers, including the reorder buffer 107 and the reservation station 135. The allocator 150 and the instruction issue units 120 and 121 are coupled to the reservation station 135 and are also coupled to the RAT 114, which performs register renaming. The RAT 114 is coupled, via internal bus 109, to provide the reservation station 135 with instruction information for subsequent dispatch. The reservation station 135 is coupled to supply dispatched instruction information to the execution cluster 125, which includes an integer unit (IEU) 125a, a floating point unit (FEU) 125b, a memory unit (MIU) 125c, and an address generation unit (AGU) 125d. In one implementation, execution cluster 125 includes multiple units of the same type (e.g., multiple integer units and multiple address generation units), as discussed in more detail below.

The execution cluster 125 of the processor 100 includes execution units that execute the integer and floating point instructions dispatched from the RS 135, including those integer and floating point instructions that are speculatively fetched and issued. Similarly, the execution cluster 125 also includes a memory execution unit that executes and dispatches load and store instructions to a data cache memory which are dispatched from the RS 135, including those load and store instructions that are speculatively fetched and issued.

The AGU 125d, IEU 125a, FEU 125b, and MIU 125c are all coupled to reservation station 135 via a dispatch bus 160. They are also coupled to writeback bus 108. RS 135 is coupled to the writeback bus 108 and the internal bus 109. The RS 135 is also coupled to ROB 107 and RRF 106. ROB 107 is also coupled to the internal bus 109 and the writeback bus 108. The ROB 107 and RRF 106 are coupled to hold, dispatch, execute and commit execution results of instructions. The instructions may be dispatched and executed out-of-order. Execution core 125 may include multiple IEUs, such as two, and multiple FEUs, such as two.

In general, the memory ordering buffer (MOB) 180 buffers all store and load operations, and controls dispatching of the load and store operations. In addition, the MOB 180 tracks the progress of memory operations through execution, and retires the memory operations, when appropriate, by committing results to a memory state. Upon retirement of a store operation, the MOB 180 dispatches the store operation in a "background" mode of operation at the convenience of the memory system.

In operation, the instruction issue units 120 and 121 fetch instructions from an external memory, such as memory unit 112, through the bus interface 130 via bus 101. The fetched instructions are stored in an instruction cache (not shown). The bus interface 130 manages transfers of data between external components and the processor 100. In addition, it manages cache coherency transfers. The instruction issue units issue several instructions within a given clock cycle in program code order to the register alias table 114 and the allocator 150. Some instructions are fetched and issued speculatively. The instruction issue units may issue a multiple number of instructions (e.g., 1, 2, or 3) within a common clock cycle.

The allocator 150 according to one embodiment of the present invention interrogates a deallocation vector (generated by the reservation station 135) for vacant entries and from this vector assigns the issued instructions a vacant entry of the reservation station 135 for each micro operation. In one implementation, this interrogation of the deallocation vector to locate the vacant entries of the RS 135 is accomplished very rapidly, taking no more than one clock cycle. The allocator 150 also assigns each incoming micro operation to a vacant location (entry) in the reorder buffer 107, thereby mapping the logical destination address (LDST) of the micro operation to a corresponding physical destination address (Pdst) in the ROB 107. The register alias table 114 maintains this mapping for the most recently renamed logical destination registers. By renaming the registers used by the instructions to a larger set of physical registers that reside in the ROB 107, false data dependencies between instructions may be removed allowing additional parallel execution of instructions.

The out-of-order cluster 105 schedules the instructions for execution depending on data availability and other constraints. When the source data becomes available and an execution unit becomes free, an associated instruction within the reservation station 135 becomes eligible for dispatch to the execution cluster 125. The execution cluster 125 performs the dispatched instruction and returns the data to the out-of-order cluster 105. Result data is then stored in the ROB 107.

The contents of a ROB register are retired to a location in a real register file 106 in program code order when the register becomes part of a properly predicted program pathway. The ROB 107 maintains this program code order because the ROB 107 was filled by the in-order cluster 110. Since both the RRF 106 and the ROB 107 can be a source for operand data, the RAT 114 stores a real register file valid bit (RRFV) that indicates whether the value indicated by the logical address is to found at the physical address in the ROB 107 or in the RRF 106 after retirement. Based upon this mapping, the RAT 114 also associates every logical source address to a corresponding location in the ROB 107 or the RRF 106 (the source operand of one instruction generally must have been the destination of a previous instruction).

Reservation station 135 receives and stores information pertaining to the issued instructions that are pending execution and resolves their operands with data from the IEU 125a, the FEU 125b, the data cache memory (not shown), the ROB 107 and RRF 106 and holds them until their operands are all resolved. The RS 135 then dispatches the issued instructions to the AGU 125d, the IEU 125a, the FEU 125b and the MIU 125c as appropriate. Each incoming micro operation is also assigned and written into an entry in the reservation station 135 by the allocator 150. The reservation station 135 assembles the instructions awaiting execution by an appropriate execution unit, such as integer execution unit 125a. The use of register renaming in the ROB 107 not only avoids register resource dependencies to permit out-of-order execution, but also plays a role in speculative execution since the ROB 107 contains only speculative data. If an instruction sequence is considered to be part of a predicted branch, then the execution of those instructions using the renamed registers in the ROB 107 has no effect on the actual registers denoted by the instruction. Thus, if it is determined that the branch was mispredicted, the results calculated and stored in the ROB 107 by the instructions on the mispredicted path may be discarded and the pipeline flushed without affecting the actual registers found in the register file 106. If instructions from the mispredicted branch path affected the values in the RRF 106, then it would be difficult to recover from branch misprediction because it would be difficult to determine the values stored in the registers at the time of the mispredicted branch.

After execution within one of the execution units, when a result is produced, it is written to the ROB 107. The result may provide an input operand to one or more waiting instructions buffered in the reservation station 135, indicating that the source operand is ready for dispatch to one or more execution units. Generally, the operand data is obtained from the ROB 107 or writeback bus 108 and this information is either forwarded to the appropriate execution units from the reservation station 135 for execution when an instruction is scheduled and dispatched, or bypassed directly to the execution units from writeback bus 108. When the checking logic of the processor determines that a particular instruction is associated with a properly predicted branch, and all other conditions are satisfied, an instruction that has been executed and placed into the ROB 107 may retire. The associated Pdst of that retiring instruction is then written into the RRF 106 and becomes architecturally visible. The IEU, FEU, and the MIU in turn perform their operations accordingly. The execution results of the integer, floating point and load instructions are held in the ROB 107, and then committed to the RRF 106 in strict Von Neumann order. Speculative execution results of the mispredicted branches are not committed, but instead are held in the ROB 107 and deallocated upon retirement of the mispredicted branch.

Regarding the structure of processor 100, the following terminology describes the relevant processing stages of the instructions. The Issue stage refers to the merging of the in-order stream of instructions from the issue cluster with the corresponding source data which is provided by the ROB 107 and then placing this information into the reservation station 135. A set of three, or fewer, instructions are issued within a common clock cycle. Within the issue stage, registers used by the instruction are renamed to registers within the ROB 107 and this renaming occurs within the RAT 114. At the Issue stage, instructions may be part of a speculative program path as a result of a branch prediction.

Also at the Issue stage, instruction information is allocated during two Allocation stages that make up a two cycle allocation pipeline (the allocation is actually performed in one cycle, but is staggered across two clock cycles). During Allocation (e.g., during a given or current allocation cycle), the allocator 150 determines which entries of the reservation station 135 are vacant (e.g., which ones were dispatched previously) and assigns these vacant entries to the set of newly issued instructions. The two pipestage implementation determines which entries are vacant during a current stage (n) and assigns them to micro operations received at the next subsequent stage (n+1).

The Ready/Schedule stage identifies all the instructions ready to execute (Ready stage) that are pending in the RS 135 and selects (Schedule Stage) a group (e.g., by FIFO or similar process) for execution and also schedules an execution unit. For a given clock cycle, not all instructions that are ready may be scheduled. At Dispatch, the scheduled instructions are forwarded to a selected execution (functional) unit. At Writeback, the results generated by the functional units are written into appropriate entries of the ROB 107 and also the RS 135 (if any instructions in the RS 135 are dependent on the results). Also, the writeback ports are examined for results that are sources of instructions pending in the RS 135 so that the data-ready status of these pending instructions may be updated. At Retirement, the results from the ROB 107 that pertain to instructions that are properly predicted and also properly executed are placed into an architecturally visible buffer (RRF 106) in their original issued order. Upon misprediction, the speculative data in the ROB 107 is dispatched.

Figure 2:
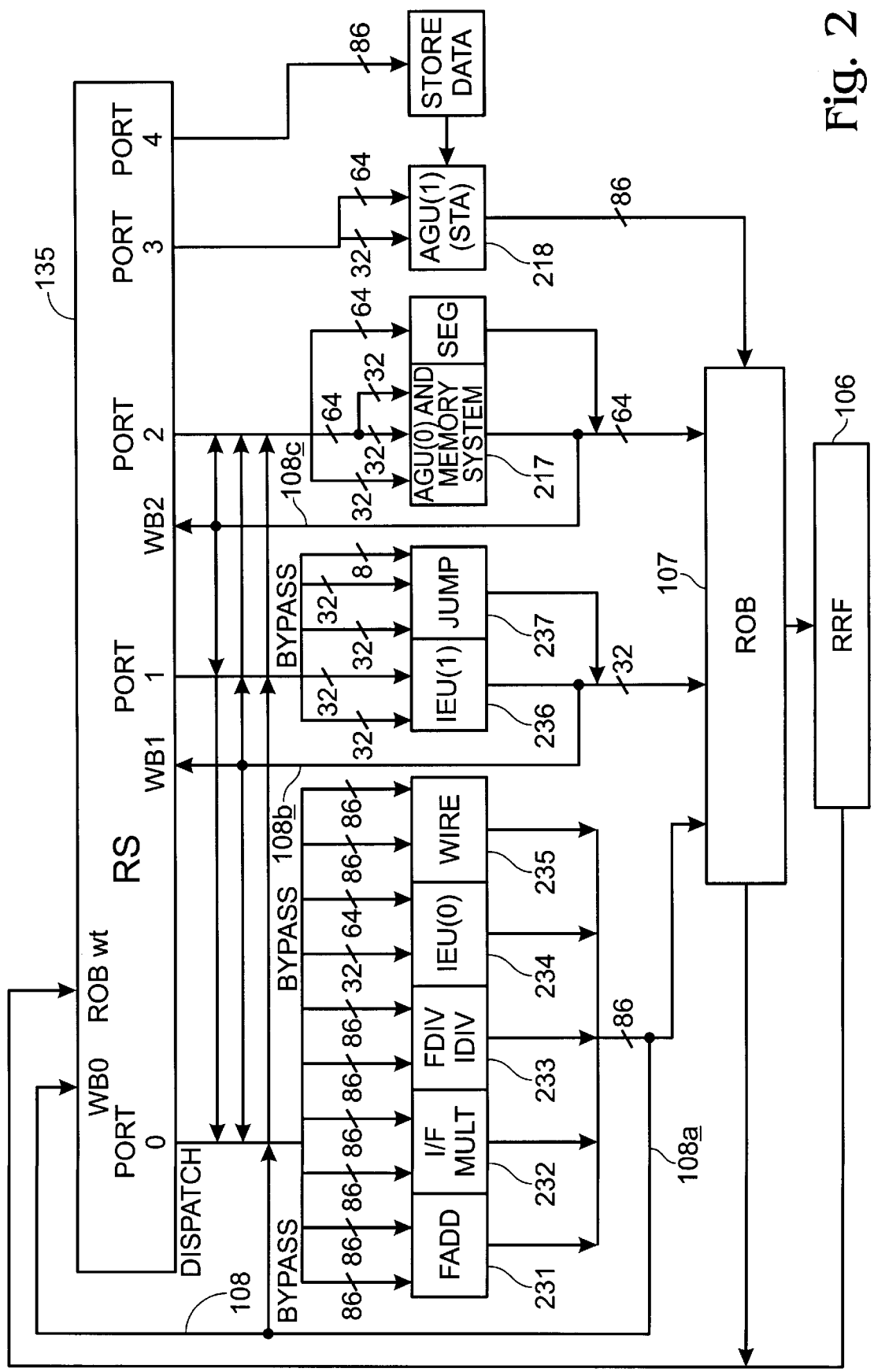
FIG. 2 shows an execution cluster and part of an out-of-order cluster according to one embodiment of the present invention.

FIG. 2 is a more detailed diagram of the execution cluster and part of the out-of order cluster according to one embodiment of the present invention. The reservation station 135 is an SRAM register file in front of the functional units that performs several functions. Its data fields serve as a temporary buffer for instructions and the source data that is or will be available. The reservation station 135 maintains waiting instructions and is "watching" all the result/writeback buses from all the execution interfaces "looking" for source data that it needs for its micro operations. When the watched-for data arrives on the writeback bus 108, the reservation station 135 writes it into the appropriate source data field or fields.

Once all the source operands for a micro operation are in the reservation station 135, the reservation station 135 determines when an appropriate execution unit is available and schedules the data-ready micro operation for dispatch.

In one embodiment, there are five execution units coupled to Dispatch Port 0 from reservation station 135. These are the floating point add unit 231, the multiply unit 232 for performing integer and floating point multiplies, integer and floating point divide unit 233, integer execution unit 234, and a wire unit 235. As was described, the complex Intel Microprocessor instruction set is reduced to a simpler stream of micro operations. These micro operations, when they are dispatched from the reservation station, are operated on by the various execution units. Most applications heavily utilize either the integer execution unit or the floating point units. Integer execution unit 234 is designed to be able to process data-ready micro operations in one clock cycle. In one embodiment, the integer execution unit 234 receives a data item having a source width of 32 bits. The floating point execution units 231, 232 and 233 carry out more complicated tasks when they receive data-ready micro operations. In one implementation, these floating point functional units receive input streams having a width of 86 bits for each source data item.

In one embodiment of the present invention, a floating point add requires three clock cycles to execute, and a floating point multiply requires five clock cycles to execute. Floating point divides and square roots, which are both carried out by the floating point divide unit 233, have variable length latencies depending upon the precision required for their result. The wire unit 235 is a hybrid execution unit implemented in one embodiment for various catch-all instructions. It is similar to a floating point unit in that its input stream is 86 bits wide per source, but it is more like an integer execution unit in that it performs its operations in a single clock cycle.

Dispatch port 1 from reservation station 135 also has two execution units coupled to it. There is an integer execution unit 236 and a jump unit 237. The integer execution unit 236 may be identical to the execution unit 234, or it may have additional or different functionality. Two integer execution units are provided because of the high volume of integer micro operations common in most code, thereby enhancing performance of the overall system. Of course, alternative microprocessors may incorporate more or fewer execution units depending upon design objectives.

Coupled to the reservation station 135 through Dispatch Ports 2, 3 and 4 are the memory system execution units. The AGU[0] and memory system cluster 217 calculates memory addresses for loads and processes the loads. The load result is then provided to the ROB 107 and to the reservation station 135 through writeback path 108c. Similarly, stores are propagated through Dispatch Ports 3 and 4 of the reservation station 135. The AGU[1] unit 218 calculates store addresses and propagates them through the memory system.

Figure 3:
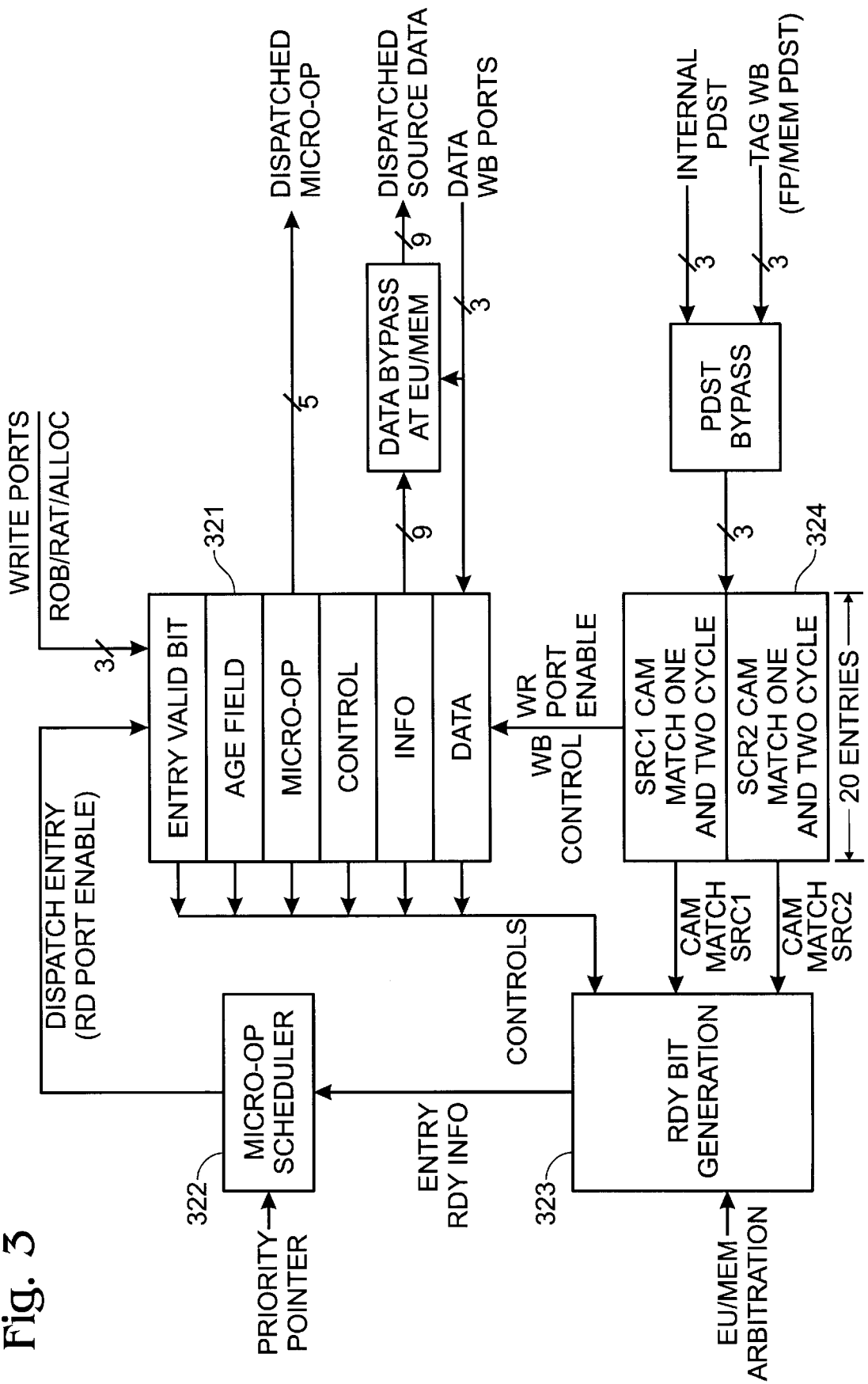
FIG. 3 shows a reservation station according to one embodiment of the present invention.

In FIG. 3, the micro operations and associated data are shown as a large array 321. The content of information for a given micro operation includes the micro operation instruction, source operands, control bits indicating the validity of the source data as well as information indicating the necessary functional unit for a given micro operation to be dispatched to. In one embodiment of the present invention, micro operations are written into reservation station 135 with data indicating a particular Dispatch Port over which the micro operation is to be dispatched. As an alternative to this static binding of micro operations to specific execution units, scheduler 322 may schedule a micro operation capable of executing on multiple execution units to the first that is available when the micro operation is data-ready. By dynamically binding a micro operation to a functional unit at scheduling rather than statically binding at allocation, improvements to overall system performance may be obtained.

Coupled to the reservation station array is the micro operation scheduler 322. The micro operation scheduler peruses the reservation station memory array looking for data-ready micro operations to dispatch. A micro operation is ready when all valid source data has been determined by the reservation station and an appropriate functional unit is available when the micro operation is ready to be dispatched. Valid source data is determined either by receipt of the data or upon receiving information that the data will be ready in time for scheduling.

The micro operation scheduler 322 is informed of ready micro operations by receiving a signal from the ready bit generation logic 323. The ready bit generation logic 323 receives input signals that indicate the availability of functional units, the activation of valid bits for source data from the reservation station and any data forwarding information detected by the content addressable memory (CAM) logic 324 which performs tag matching for needed data being concurrently written back.

Also included in the information kept in the reservation station memory array is an age field used to indicate how long each micro operation has been present in the reservation station. The scheduling routine models the reservation station array as a circular queue and begins micro operation selection (sequential scan) dependent upon the relative age of the micro operations in the array. Essentially, program order dictates scheduling priority when more than one micro operation is ready to be scheduled for the same execution unit interface. In one implementation, each entry in the array has an age counter that saturates at a count of 8, however, it is to be appreciated that counters accommodating higher or lower counts may be used.

Micro operations can have up to three source operands. In one embodiment of the present invention, control bits are written into a reservation station entry identifying whether the micro operation requires a second or a third source operand. In an alternate embodiment, the number of source operands necessary for a particular micro operation is coded into the opcode for the micro operation.

Examples of instructions which require three source operands include any instruction which requires an effective address. This can include, for example, memory load and store instructions, move instructions, and addition and subtraction instructions. An effective address is generated using three components: a base, an index, and a displacement. The base is typically a value in a first register, the index is typically a value in a second register, and the displacement is an immediate value which is provided as part of the original instruction. In one embodiment the index is scaleable (e.g., by a scale factor of either 1, 2, 4 or 8). These three components are provided as the source operands to an execution unit.

According to one embodiment, the present invention supports four basic types of operands, or four different instruction formats, each of which has its own type set of operands, which are defined in terms of the instructions to which they correspond. These four are: integer operands, conditional operands, address generation operands, and floating point operands. These different types of operands all use the same entries in the reservation station, as well as use some of the same wires in being transferred to the execution units, as discussed in more detail below.

The different types of operands required for different execution units according to one embodiment of the present invention is as follows. The integer execution unit(s) uses two or three 32-bit integer operands. The conditional execution unit(s) uses two 32-bit integer operands and also uses an 8-bit flag value which indicates whether the condition has been satisfied. The address generation unit(s) uses two or three 32-bit integer operands. The floating point execution unit(s) uses two 86-bit floating point operands.

Figure 4A:
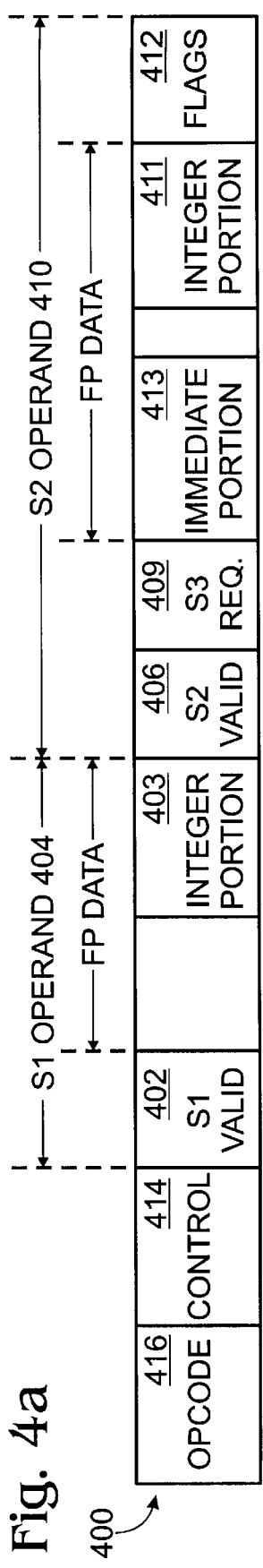
FIG. 4a shows an entry of a reservation station array according to one embodiment of the present invention.

FIG. 4a shows an example of an entry of a reservation station array according to one embodiment of the present invention. An entry 400 is shown including a first source (S1) operand 404, a second source (S2) operand 410, flag field 412, control information field 414 and an opcode (micro operation code) field 416. The control information 414 field includes, for example, the age field and entry valid bit shown in FIG. 3. The flag field 412 corresponds to various flags corresponding to the micro operation stored in the entry which can be set. A flag can be set dependent on the micro operation when it is placed in the reservation station, or alternatively may be set upon completion of execution by an execution unit. These flags can be architecturally visible flags, or alternatively may be used only internally by the micro-code. Examples of flags include status bits such as a carry flag, an overflow flag, a divide-by-zero flag, etc. In one implementation, flag field 412 is an 8-bit field. In alternate embodiments, the flag field 412 can store additional information. For example, in one alternate embodiment, the flag field 412 can also store fault information or interrupt vector information. In another alternate embodiment, the flag field 412 can be used to store additional source data for certain micro operations.

The reservation station entry 400 includes two source operands 404 and 410. S1 operand 404 is an 86-bit field used to store the first source operand for a micro operation. An S1 valid bit 402 is part of source operand field 404 and is set when the data for S1 operand 404 is valid. The data may be valid when the micro operation is input to the reservation station entry 400 or may be written back to the reservation station entry 400 at a later time, as discussed above. S1 operand 404 can store either 86-bit values (e.g., for floating point operations) or 32-bit values (e.g., for integer operations). In one implementation, if only 32 bits are used, then the value is stored in the integer portion 403 of S1 operand 404. In one implementation, the integer portion 403 is the lower 32 bits of S1 operand 404.

S2 operand 410 is an 86-bit field which is used to store the second operand for a micro operation. The second source operand could be either a 32-bit value(s) or an 86-bit value.

S2 operand 410 also includes an S2 valid bit 406. S2 valid bit 406 is set when valid data for the second source operand is written into source operand field 410. The data may be valid when the micro operation is input to the reservation station entry 400 or may be written back to the reservation station entry 400 at a later time, as discussed above.

If the micro operation requires three source operands, then source operand field 410 includes both the second and third source operands. In one embodiment, the second and third source operands must both be 32-bit operands in order to both be contained in the 86-bit S2 operand field 410. If the micro operation in reservation station entry 400 requires a source three operand, then a source three (S3) required bit 409 is set by the RAT 114 when the micro operation is written into the entry 400.

In one implementation, the integer portion 411 of S2 operand 410 contains the second source operand and the immediate portion 413 of S2 operand 410 contains the third source operand. In one implementation, the integer portion 411 is the lowest 32 bits of S2 operand 410 and immediate portion 413 is the next lower 32 bits of S2 operand 410 (e.g., bits [31:0] are integer portion 411 and bits [63:32] are immediate portion 413. However, it is to be appreciated that any of the 86 bits in source operand field 410 could be used as the 64 bits for source two and source three operands.

In one embodiment of the present invention, the write enables for the bits of source operand field 410 can be selectively activated. That is, when writeback data is returned to the reservation station 135 from one of the execution units, reservation station 135 checks whether any of the entries in reservation station 135 are currently waiting for the data being written back. If data is written back which corresponds to the first source operand, then only the write enables for S1 operand 404 are enabled. If data is written back which corresponds to the second source operand of a two-source operand micro operation (as determined by the S3 required bit 409), then the write enables for S2 operand 410 are enabled.

In one embodiment of the present invention, only source one and source two data can be register data. In this embodiment, source three data is limited to being immediate data (that is, data which is provided as part of an instruction, such as an address displacement or a constant). This immediate data is carried with the instruction and written into reservation station 135 when the micro operation is written into reservation station 135. Thus, in this embodiment, the source three operand is always valid in the reservation station 135. It is to be appreciated that the source one and source two data can also be immediate data. It is also to be appreciated that in alternate embodiments any of the operands can be register or immediate data.

In situations where both the second and third source operands are being stored in source operand field 410, then only the write enables corresponding to the second source operand (e.g., the integer portion 411) are activated when data is being written back.

The source three required bit 409 can be used to determine which write enables for source operand field 410 are activated. If S3 required bit 409 is set (e.g., a logical "1"), then only the write enables corresponding to the second source operand (e.g., the lower 32 bits of field 410) are activated when source two data is being written back. However, if S3 required bit 409 is not set (e.g., a logical "0"), then all of the write enables for source operand field 410 are activated when source two data is being written back.

Figure 4B:
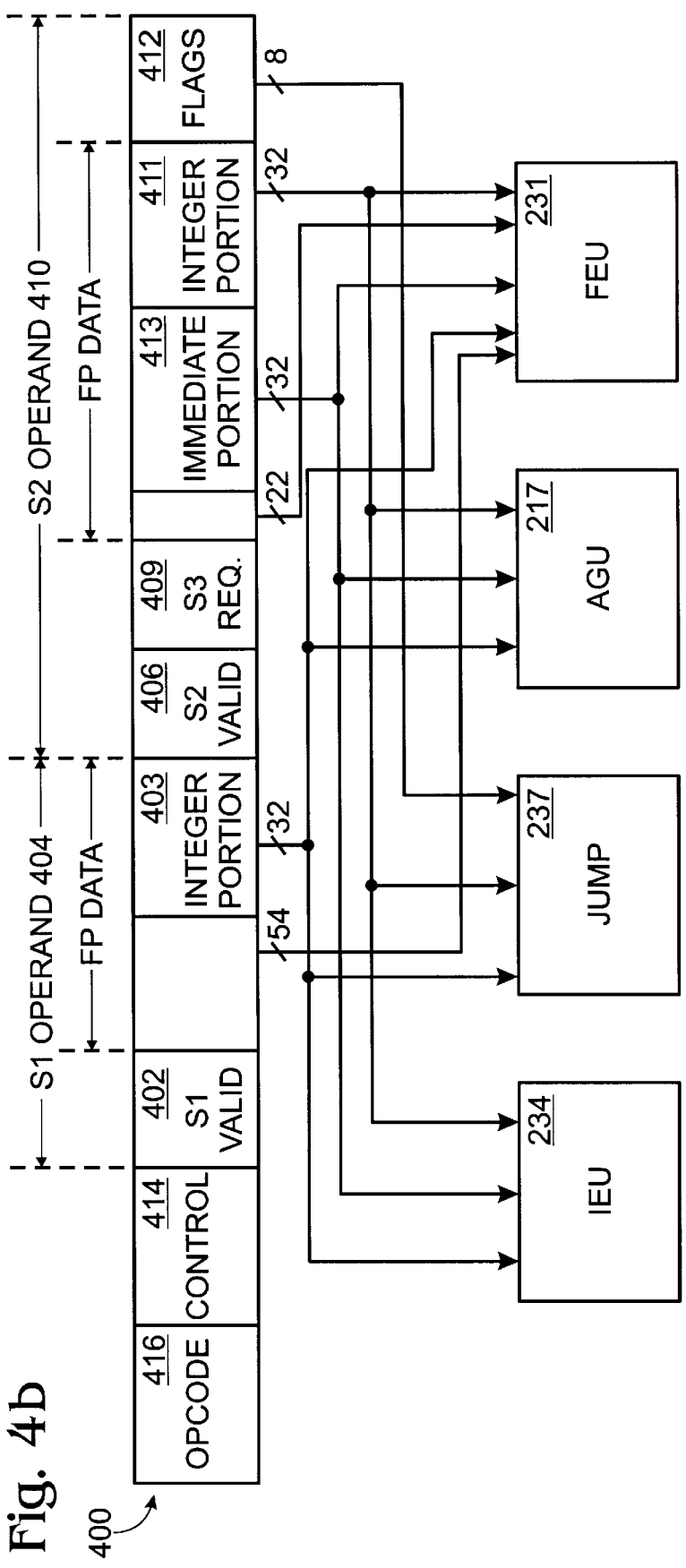
FIG. 4b illustrates the flow of data from an entry of the reservation station to the execution units according to one embodiment of the present invention.

FIG. 4b illustrates the flow of data from an entry of the reservation station to the execution units according to one embodiment of the present invention. Four execution units are illustrated in FIG. 4b: an instruction execution unit (IEU) 234, a jump unit 237, an address generation unit (AGU) 217, and a floating point execution unit (FEU) 231. As discussed above with reference to FIG. 2, a microprocessor can include multiple execution units of the same type. Only four execution units have been illustrated in FIG. 4b to avoid cluttering the drawings. However, it is to be appreciated that additional execution units may also be included.

As illustrated in FIG. 4b, the IEU 234 receives three 32-bit operands. The first operand is from the integer portion 403 of the S1 operand 404, the second operand is from the integer portion 411 of the S2 operand 410, and the third operand is from the immediate portion 413 of the S2 operand 410. Which of these three operands is actually used by the IEU 234 depends on the particular micro operation being executed by the IEU 234 (e.g., if a micro operation requires only two source operands then the IEU 234 would only use the first and second source operands and ignore whatever is received from the immediate portion 413).

The jump unit 237 receives two 32-bit operands and an 8-bit flag value. The first operand is from the integer portion 403 of the S1 operand 404, and the second operand is from the integer portion 411 of the S2 operand 410. The flags value is from the flags field 412 of the S2 operand 410.

The AGU 217 receives three 32-bit operands. The first operand is from the integer portion 403 of the S1 operand 404. The second operand is from the immediate portion 413 of the S2 operand 410, and the third operand is from the integer portion 411 of the S2 operand 410.

The FEU 231 receives two 86-bit operands. The first operand is the floating point (FP) data from the S1 operand 404, and the second operand is the FP data from the S2 operand 410.

As illustrated in FIGS. 4a–4b, the different operand types overlap in both the reservation station and the data lines which transfer the operands to the execution units. For example, data for both integer and floating point operands is stored in the same operand fields of the reservation station entries. By way of another example, the same data path is used to transfer an integer operand to an execution unit as is used to transfer a portion of a floating point operand to its execution unit.

Figure 5:
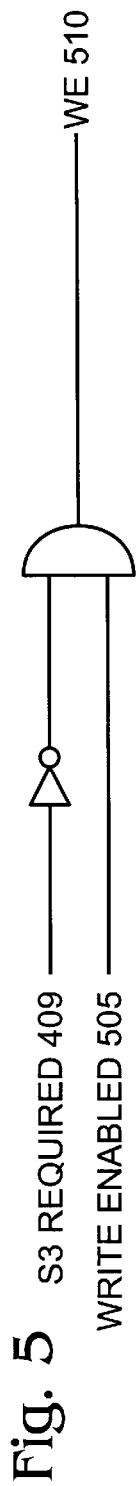
FIG. 5 is a diagram showing the qualification of a write enable signal according to one embodiment of the present invention.

FIG. 5 is a logic diagram showing the qualification of a write enable signal according to one embodiment of the present invention. Write enable signals which are input to source operand field 410 which do not correspond to the second source operand (e.g., the lower 32 bits of field 410) are qualified as shown in FIG. 5. When data is written back to source operand field 410, a write enable signal 505 is provided to the bit storage device which allows the bit being written back to be stored. The write enable signal 505 is logically AND'd together with the inverse of the value stored in S3 required bit 409, thereby generating write enable (WE) signal 510. Thus, a bit written back to source operand field 410 which does not correspond to the second source operand is only stored in operand field 410 if a third source operand is not required, thereby preventing the overwriting of the third source operand.

Referring again to FIG. 2, when a micro operation is dispatched from reservation station 135, the opcode, flag data, and source operands are provided to the appropriate execution unit over the appropriate dispatch port. For execution units which can use 86-bit source one operands (e.g., Fadd unit 231 or I/F Mult unit 232), all 86 bits of S1 operand 404 are provided to the execution unit. For execution units which only use a 32-bit source one operand (e.g., IEU 234, IEU 236 or AGU 217), only the integer portion 403 of S1 operand 404 is provided to the execution unit.

For execution units which can use 86-bit source two operands (e.g., Fadd unit 231 or I/F Mult unit 232), all 86 bits of S2 operand 410 are provided to the execution unit. For execution units which only use a 32-bitsource two operand (e.g., IEU 236), only the integer portion 411 of S2 operand 410 is provided to the execution unit.

In one embodiment of the present invention, three-source operands can only be dispatched over port 0, port 2, and port 3. Thus, in this embodiment, integer operations which require three source operands must be dispatched over port 0 of reservation station 135.

For execution units which can use three source operands (e.g., IEU 234 or AGU 217), both the integer portion 411 and the immediate portion 413 of S2 operand 410 are provided to the execution unit. For example, IEU 234 of FIG. 2 receives a 32-bit operand (corresponding to source one) and a 64-bit operand (corresponding to source two and possibly source three).

In one embodiment, an execution unit knows the number of operands required and the size of those operands (e.g., 32 or 86 bits) required for a particular micro operation based on the opcode it receives. Any data received for an operand which is not needed by the execution unit is ignored by the execution unit. For example, if a micro operation requiring only two source operands is dispatched to IEU 234 of FIG. 2, then IEU 234 knows that only the 32 bits corresponding to the source two data (e.g., the lower 32 bits) of the 64-bit input data is needed for the operation.

The flags data is written into the RS 135 and the ROB 107 by allocator 150. If data is written into RS 135 as a source two operand by allocator 150, then the flags data corresponding to the data is also written into the RS 135 entry. Whenever data is read from the ROB 107 as a source two operand, then the flags data stored in ROB 107 is also read.

The flag data is also dispatched to the execution unit from reservation station 135 along with the opcodes and source operands. In the embodiment illustrated in FIG. 4b, the flags data 412 is input to the jump unit 237. However, in alternate embodiments, each of the execution units receives an eight-bit flag data path.

Upon completing execution, the output data is written into the ROB 107 and also written back to the RS 135, as discussed above. The flag data for the micro operation, as modified by the execution unit (e.g., a carry flag may be set by the execution unit), is also forwarded to the ROB 107 and the RS 135. If the data written back to the RS 135 is written back as a source two operand, then the flag data is also written into the entry with the data. Similarly, the flag data is written into the ROB 107, and thus made available for any subsequent reads from ROB 107 for source two operand data.

In one embodiment, each of the registers in ROB 107 stores an 86-bit operand. Thus, operands and result data for both integer and floating point operations can be written into any of the registers of ROB 107. Additionally, ROB 107 also includes register space for the flag data, as discussed above.

Thus, the present invention supports overlapping of multiple operand types in a microprocessor. Operands are stored in the same registers of the RS 135 and ROB 107, regardless of whether they corresponds to, e.g., a floating point operand or an integer operand. Therefore, the same control logic can be used to control multiple types of operands in the microprocessor.

It should be noted that in certain situations, it is beneficial to treat integer values as floating point values and floating point values as integer values. The present invention makes such reverse treatment simple, due to the overlapping of operands. As discussed above, a value is stored in the same set of registers, regardless of whether it is a floating point or an integer value.

The present invention also provides greater flexibility in micro-code instructions. For example, certain micro operations may take two 32-bit source operands and convert them into a 64-bit result. Since the present invention provides for 86-bit operand data paths from an integer execution unit (for example, from dispatch port 0 of FIG. 2), the write-back of the 64-bit result can be done as a single operation, rather than split into two separate pieces (and therefore requiring additional clock cycles).

Additionally, situations can arise where integer data needs to be a 64-bit value. For example, a segment descriptor used by AGU 217 of FIG. 2 may be a 64-bit value. This 64-bit value can be input to AGU 217 as a single micro operation due to the 64-bit source two input. This 64-bit value can be stored in reservation station 135 as a single source two operand with no source three operand required. Upon receipt of the opcode, AGU 217 can treat the data as a single 64-bit value rather than as two 32-bit values. Thus, the 64-bit value can be input to AGU 217 as a single micro operation rather than split into two separate micro operations (and therefore requiring additional clock cycles).

It is to be appreciated that although the above description discusses a particular one of the source operand fields in the reservation station as being capable of storing two operands, that either one of the two source operands could be configured to store two operands. Furthermore, it is also to be appreciated that both source operand fields could be configured in an alternate embodiment to store two source operands, thereby providing the ability to store four source operands. This could be accomplished for example, by providing an additional bit in the reservation station entry 400 of FIG. 4*a* indicating whether source operand field 404 stores one or two operands.

Figure 6:
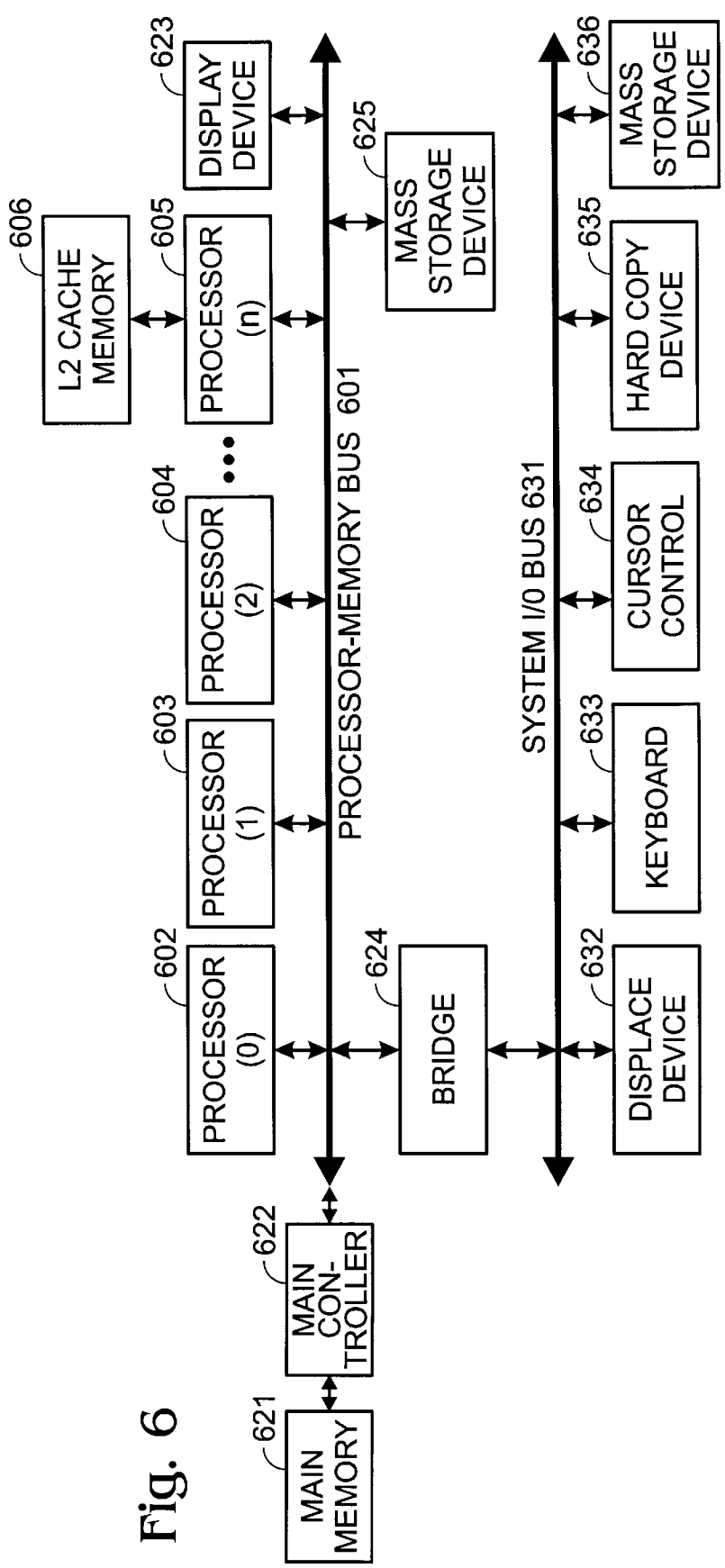
FIG. 6 shows a computer system such as may be used with one embodiment of the present invention.

FIG. 6 shows an overview of an example multiprocessor computer system such as may be used with one embodiment of the present invention. The computer system generally comprises a processor-memory bus or other communication means 601 for communicating information between one or more processors 602, 603, 604 and 605. The processor-memory bus 601 includes arbitration, address, data and control buses (not shown). In one embodiment, the processors 602 through 605 each includes a small, extremely fast internal cache memory (not shown), commonly referred to as a level one (L1) cache memory for temporarily storing data and instructions on-chip. In addition, a bigger, slower level two (L2) cache memory 606 can be coupled to any of the processors, such as processor 605, for temporarily storing data and instructions for use by the processor. Each processor may have its own, optional L2 cache, or some may share an L2 cache.

Processors 602, 603, and 604 may each be a parallel processor (a symmetric co-processor), such as a processor similar to or the same as processor 605. Alternatively, processors 602, 603, or 604 may be an asymmetric co-processor, such as a digital signal processor. In addition, processors 602 through 605 may be heterogeneous.

The processor-memory bus 601 provides system access to the memory and input/output (I/O) subsystems. A memory controller 622 is coupled to the processor-memory bus 601 for controlling access to a random access memory (RAM) or other dynamic storage device 621 (commonly referred to as a main memory) for storing information and instructions for processors 602 through 605. A mass data storage device 625, such as a magnetic disk and disk drive, for storing information and instructions, and a display device 623, such as a cathode ray tube (CRT), liquid crystal display (LCD), etc., for displaying information to the computer user may be coupled to the processor-memory bus 601.

An input/output (I/O) bridge 624 may be coupled to the processor-memory bus 601 and a system I/O bus 631 to provide a communication path or gateway for devices on either processor-memory bus 601 or I/O bus 631 to access or transfer data between devices on the other bus. Essentially, the bridge 624 is an interface between the system I/O bus 631 and the processor-memory bus 601.

The I/O bus 631 communicates information between peripheral devices in the computer system. Devices that may be coupled to the system bus 631 include, for example, a display device 632, such as a cathode ray tube, liquid crystal display, etc., an alphanumeric input device 633 including alphanumeric and other keys, etc., for communicating information and command selections to other devices in the computer system (e.g., the processor 602) and a cursor control device 634 for controlling cursor movement. Moreover, a hard copy device 635, such as a plotter or printer, for providing a visual representation of the computer images and a mass storage device 636, such as a magnetic disk and disk drive, for storing information and instructions may also be coupled to the system bus 631.

In certain implementations of the present invention, additional processors or other components or buses may be included. Additionally, in certain implementations components may be re-arranged. For example, the L2 cache memory 606 may lie between the processor 605 and the processor-memory bus 601. Furthermore, certain implementations of the present invention may not require nor include all of the above components. For example, the processors 602 through 604, the display device 623, or the mass storage device 625 may not be coupled to the processor-memory bus 601. Additionally, the peripheral devices shown coupled to the system I/O bus 631 may be coupled to the processor-memory bus 601; in addition, in some implementations only a single bus may exist with the processors 602 through 605, the memory controller 622, and the peripheral devices 632 through 1336 coupled to the single bus.

In one embodiment, the present invention is implemented in a microprocessor that executes the well-known Intel Architecture Microprocessor instruction set, such as the Intel Pentium® Pro processor. The present invention may, however, be implemented in any of a wide range of conventional microprocessor architectures. A variety of microprocessors may take advantage of the present invention whether those microprocessors occupy a single chip or more than one chip and regardless of the materials used to fabricate the chip including silicon or gallium arsenide.

Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

Thus, a mechanism for efficiently overlapping multiple operand types in a microprocessor has been described.

What is claimed is:

1. An apparatus for use in a microprocessor, the apparatus comprising:

a plurality of execution units;

a mechanism to selectively provide operations to each of the plurality of execution units, wherein each of the operations includes one or more operands;

wherein the mechanism to provide the operations embeds multiple data types in the one or more operands of the operations; and wherein each execution unit of the plurality of execution units interprets the one or more operands as different types of operands based, at least in part, on the data types embedded therein.

2. The apparatus of claim 1, wherein at least one of the one or more operands comprises an operand value.

3. The apparatus of claim 1, wherein the mechanism to provide operations provides different types of operands to the plurality of execution units via common data lines.

4. The apparatus of claim 1, wherein the mechanism to provide operations comprises a reservation station.

5. The apparatus of claim 1, wherein the microprocessor performs out-of-order instruction execution.

6. The apparatus of claim 1, wherein the mechanism to provide operations also provides an indicator of the type of at least one of the one or more operands.

7. The apparatus of claim 1, wherein the mechanism to provide operations stores the different types of operands corresponding to different operations in the same operand storage location.

8. The apparatus of claim 7, further comprising a plurality of write enable signal lines which are selectively activated to allow only a portion of the operand storage location to be written to.

9. The apparatus of claim 8, further comprising an indicator, coupled to the plurality of write enable signal lines, to indicate the type of operand stored in the operand storage location.

10. The apparatus of claim 7, wherein the operand storage location can store operands of different sizes, wherein the portion of the operand storage location used to store a smaller operand is a subset of the portion of the operand storage location used to store a larger operand.

11. The apparatus of claim 10, wherein the larger operand comprises a floating point operand and the smaller operand includes one or more integer operands.

12. The apparatus of claim 10, wherein the larger operand comprises a floating point operand and the smaller operand comprises an integer and an immediate value.

13. The apparatus of claim 10, wherein the smaller operand includes flag data corresponding to at least one of the one or more operands.

14. A microprocessor comprising:

a plurality of execution units;

a mechanism to selectively provide operations to each of the plurality of execution units, wherein each of the operations includes one or more operands;

wherein the mechanism to provide the operations embeds multiple data types in at least one of the one or more operands; and wherein each execution unit of the plurality of execution units interprets the one or more operands as different types of operands based, at least in part, on the data type embedded therein.

15. The microprocessor of claim 14, wherein the mechanism to provide operations provides different types of operands to the plurality of execution units via common data lines.

16. The microprocessor of claim 14, wherein the mechanism to provide operations comprises a reservation station.

17. The microprocessor of claim 14, wherein the mechanism to provide operations stores the different types of operands corresponding to different operations in the same operand storage location.

18. The microprocessor of claim 17, further comprising a plurality of write enable signal lines which are selectively activated to allow only a portion of the operand storage location to be written to.

19. The microprocessor of claim 17, wherein the operand storage location can store operands of different sizes, wherein the portion of the operand storage location used to store a smaller operand is a subset of the portion of the operand storage location used to store a larger operand.

20. A computer system comprising:

a bus; and a processor coupled to the bus, wherein the processor includes, a plurality of execution units;

a mechanism to selectively provide operations to each of the plurality of execution units, wherein each of the operations includes one or more operands, wherein the mechanism to provide the operations embeds multiple data types in the one or more operands, wherein each execution unit of the plurality of execution units interprets the one or more operands as different types of operands.

21. The computer system of claim 20, wherein the mechanism to provide operations to the plurality of execution units is operative to store the different types of operands corresponding to different operations in a common operand storage location.

22. The computer system of claim 21, further comprising a plurality of write enable signal lines which are selectively activated to allow only a portion of the operand storage location to be written to.

23. The computer system of claim 21, wherein the operand storage location can store operands of different sizes, wherein the portion of the operand storage location used to store a smaller operand is a subset of the portion of the operand storage location used to store a larger operand.

24. A method for executing instructions in a processor, the method comprising:

(a) storing a plurality of operations, wherein each of the operations includes one or more operands;

(b) selectively transferring the plurality of operations to each of a plurality of execution units, wherein each execution unit of the plurality of execution units interprets the one or more operands as different types of operands; and (c) embedding multiple data types in the one or more operands.

25. The method of claim 24, wherein the transferring step (b) comprises the step of providing the different types of operands to the plurality of execution units through a common bus employing common data lines.

26. The method of claim 24, wherein the storing step (a) comprises the step of storing the different types of operands corresponding to different operations in the same operand storage location.

27. The apparatus of claim 26, wherein the storing step (a) comprises the step of storing operands of different sizes in the same operand storage location, and wherein the portion of the operand storage location used to store a smaller operand is a subset of the portion of the operand storage location used to store a larger operand.

* * * * *

UNITED STATES PATENT AND TRADEMARK OFFICE
CERTIFICATE OF CORRECTION

PATENT NO.   : 5,974,523
DATED        : October 26, 1999
INVENTOR(S)  : Glew et al.

It is certified that error appears in the above-identified patent and that said Letters Patent is hereby corrected as shown below:

Column 1,
Line 27, delete "modem", insert -- modern --.

Column 5,
Line 37, before "found", insert -- be --.

Signed and Sealed this

Fifteenth Day of April, 2003

JAMES E. ROGAN
*Director of the United States Patent and Trademark Office*